United States Patent
Kamo et al.

[11] Patent Number: 5,988,733
[45] Date of Patent: Nov. 23, 1999

[54] VEHICLE BODY CONSTRUCTION

[75] Inventors: Mitsuhiro Kamo; Michiya Maeda, both of Hamamatsu, Japan

[73] Assignee: Suzuki Motor Corporation, Tokyo, Japan

[21] Appl. No.: 09/058,578

[22] Filed: Apr. 10, 1998

[30] Foreign Application Priority Data

Apr. 11, 1997 [JP] Japan ................................ 9-093304

[51] Int. Cl.⁶ ................................................ B60J 7/00
[52] U.S. Cl. ................ 296/189; 296/203.01; 296/30; 296/188
[58] Field of Search ................ 296/203.02, 203.03, 296/203.01, 205, 209, 187, 188, 189, 30

[56] References Cited

U.S. PATENT DOCUMENTS

| | | | |
|---|---|---|---|
| 5,544,933 | 8/1996 | Shahab et al. | 296/188 |
| 5,560,672 | 10/1996 | Lim et al. | 296/189 |
| 5,585,797 | 12/1996 | Hirahara et al. | 296/189 |
| 5,609,385 | 3/1997 | Daniel et al. | 296/188 |
| 5,653,495 | 8/1997 | Bovellan et al. | 296/30 |
| 5,709,407 | 1/1998 | Stephens et al. | 296/189 |
| 5,720,510 | 2/1998 | Daniel et al. | 296/203.02 |
| 5,722,715 | 3/1998 | Patel et al. | 296/189 |
| 5,725,271 | 3/1998 | Patel et al. | 296/189 |

FOREIGN PATENT DOCUMENTS 07246952 of 0000 Japan .
08301022 of 0000 Japan .

Primary Examiner—Joseph D. Pape
Assistant Examiner—Kiran Patel
Attorney, Agent, or Firm—Alston & Bird LLP

[57] ABSTRACT

A vehicle body construction of a door opening flange portion and a front pillar including a reinforcement, an inner panel, and an outer panel. One flange of the reinforcement is positioned between flanges of the inner and outer panels wherein the three flanges form a joint. Another flange of each of the inner and outer panels form a second joint. The inner and outer panel define a closed cross section shape portion and another flange of the reinforcement is joined to the inner or outer panel within the closed cross section shape portion.

2 Claims, 4 Drawing Sheets

VEHICLE BODY CONSTRUCTION

FIELD OF THE INVENTION

The present invention relates to a vehicle body construction for a four-wheel automobile and the like and, more particularly, to a vehicle body construction at a door opening flange portion of roof side portion and a front pillar portion of a four-wheel automobile and the like.

BACKGROUND OF THE INVENTION

In the cross section of side body for a four-wheel automobile, reinforcements are disposed at various locations to increase the vehicle body strength. Specifically, in a front pillar portion and roof side portion, which form a closed cross section by using an inner panel and an outer panel, a reinforcement is disposed within this closed cross section.

FIGS. 5 and 6 show the conventional constructions of front pillar portions 20 and 21, respectively. The front pillar portion 20, 21 is formed by a vehicle body construction member 25 consisting of a side body inner panel 22, a side body outer panel 23, and a reinforcement 24. Specifically, one end flange 24a of the reinforcement 24 is held between a flange 22a at one end of the side body inner panel 22 and a flange 23a at one end of the side body outer panel 23, and three elements are joined together by spot weld $S_{01}$ with these three flanges lapped. Also, the other end flange 24b of the reinforcement 24 is held between a flange 22b at the other end of the side body inner panel 22 and a flange 23b at the other end of the side body outer panel 23, and three elements are joined together by spot weld $S_{02}$ with these three flanges lapped. Thus, a closed cross section shape portion α is formed by the side body inner panel 22 and the side body outer panel 23, and the reinforcement 24 is interposed between the side body inner panel 22 and the side body outer panel 23 in such a manner as to be stretched in the closed cross section shaped portion α.

For the conventional front pillar portion 20 shown in FIG. 5, a pillar trim 26 is installed on the inside surface side (cabin side) of the side body inner panel 22 so as to correspond to the side body inner panel 22. In FIG. 5, reference numeral 27 denotes a windshield glass, 28 denotes a molding, and 29 denotes an opening trim.

For the conventional front pillar portion 21 shown in FIG. 6, a buffer 30 is disposed between the side body inner panel 22 and the pillar trim 26. The reason for disposing the buffer 30 is as follows: Because the flange portion β (see FIGS. 5 and 6), where three flanges are joined by spot weld $S_{02}$, has a high strength, unless the buffer 30 is disposed between the side body inner panel 22 and the pillar trim 26, an excessive impact force applied in the direction indicated by the arrow F in FIG. 5 (direction from the cabin inside toward the cabin outside) is directly received by the flange portion β without being bufferred. Therefore, for the front pillar portion 21 shown in FIG. 6, the buffer 30 is disposed between the side body inner panel 22 and the pillar trim 26 as described above, by which an excessive impact force applied to the pillar trim 26 is received elastically to buffer the impact force.

FIGS. 7 and 8 show the conventional constructions of roof side portions 31 and 32, respectively. Like the aforementioned front pillar portion 20, 21, the roof side portion 31, 32 is formed by a vehicle body construction member 36 consisting of a side body inner panel 33, a side body outer panel 34, and a reinforcement 35. Specifically, one end flange 35a of the reinforcement 35 is held between a flange 33a at one end of the side body inner panel 33 and a flange 34a at one end of the side body outer panel 34, and four elements are joined together by spot weld $S_{03}$ with these three flanges lapped and an edge 37a of a roof panel 37 joined onto the flange 33a of the side body inner panel 33. Also, the other end flange 35b of the reinforcement 35 is held between a flange 33b at the other end of the side body inner panel 33 and a flange 34b at the other end of the side body outer panel 34, and three elements are joined together by spot weld $S_{04}$ with these three flanges lapped. Thus, a closed cross section shape portion γ is formed by the side body inner panel 33 and the side body outer panel 34, and the reinforcement 35 is interposed between the side body inner panel 33 and the side body outer panel 34 in such a manner as to be stretched in the closed cross section shaped portion γ.

For the conventional roof side portion 31 shown in FIG. 7, a roof lining 38 is installed on the inside surface side (cabin side) of the side body inner panel 33 so as to correspond to the side body inner panel 33. In FIG. 7, reference numeral 39 denotes an opening trim.

For the conventional roof side portion 32 shown in FIG. 8, a buffer 40 is disposed between the side body inner panel 33 and the roof lining 38. The reason for disposing the buffer 40 is the same as that for the aforementioned front pillar portion 21.

For the above-described conventional construction of the front pillar portion 20 and the roof side portion 31, however, because the flange portion β, where three flanges are lapped, has a high rigidity, if an excessive impact force is applied to the pillar trim 26 or the roof lining 38 from the cabin side, the pillar trim 26 or the roof lining 38 is directly received by the rigid flange portion β, so that a reaction corresponding to the impact force may be produced or other adverse effects may be caused. Even if the buffer 30 or 40 is disposed as in the case of the front pillar portion 21 and the roof side portion 32, such adverse effects may be caused.

When it is necessary to dispose the buffer 30, 40 as in the case of the front pillar portion 21 and the roof side portion 32, it is preferable that the buffer 30 be disposed in a well-seated state between the side body inner panel 22 and the pillar trim 26, and the buffer 40 be disposed in a well-seated state between the side body inner panel 33 and the roof lining 38 so that the buffer 30, 40 sufficiently accomplishes a buffering action. For this purpose, the shape of the side body inner panel 22 corresponding to the buffer 30, 40 requires a contrivance such that the buffer 30, 40 is disposed in a well-seated state, that is, the buffer 30, 40 does not escape in the direction indicated by the arrows M and N in FIGS. 6 and 8, respectively, if an excessive impact load is applied.

SUMMARY OF THE INVENTION

The present invention was made to solve the above problems, and accordingly an object thereof is to provide a vehicle body construction configured so that the rigidity of one flange portion of a vehicle body construction member may be deformed the vehicle body construction includes a closed cross section shape consisting of an inner panel, outer panel, and reinforcement disposed therebetween can be decreased to a degree such that the flange portion can be deformed moderately when an excessive impact force is applied while the strength as the vehicle body construction member is held.

Another object of the present invention is to provide a vehicle body construction in which a buffer is seated well and can sufficiently perform a buffering function.

To achieve the above objects, the present invention provides a vehicle body construction in which one flange of a reinforcement is held between one flange of an inner panel and one flange of an outer panel to join the three flanges, and the other flange of the inner panel and the other flange of the outer panel are joined to each other, by which a closed cross section shape portion is formed by the inner panel and the outer panel, and the other flange of the reinforcement is joined to the inner panel in the closed cross section shape portion.

Also, according to the present invention, the inner panel is bent from the base plane thereof toward the outer panel so as to bias the joint location between the other flange of the reinforcement and the inner panel toward the outer panel, by which the inner panel is formed with a seating surface for receiving a buffer.

Also, the present invention provides a vehicle body construction in which one flange of a reinforcement is held between one flange of an inner panel and one flange of an outer panel to join the three flanges, and the other flange of the inner panel and the other flange of the outer panel are joined to each other, by which a closed cross section shape portion is formed by the inner panel and the outer panel, and the other flange of the reinforcement is joined to the outer panel in the closed cross section shape portion.

Also, according to the present invention, a portion between one flange and the other flange of the inner panel is bent from the base plane of the inner panel toward the outer panel, by which the inner panel is formed with a seating surface for receiving a buffer.

DETAILED DESCRIPTION

Embodiments of the present invention will be described below with reference to FIGS. 1 to 3.

Figure 1:
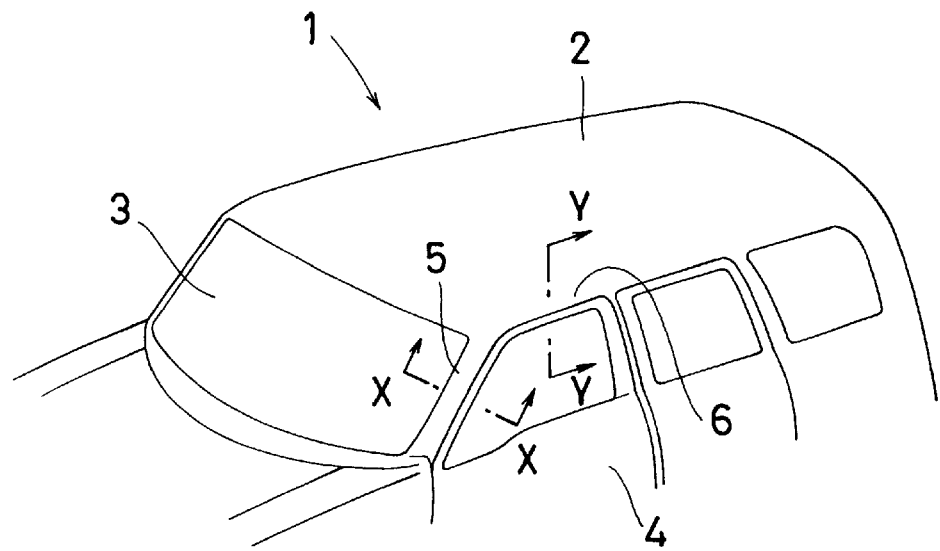
FIG. 1 is a perspective view of a four-wheel automobile having a vehicle body construction in accordance with the present invention.

FIG. 1 shows a four-wheel automobile 1 having a vehicle body construction in accordance with the present invention. In this figure, reference numeral 2 denotes a roof panel, 3 denotes a front windshield glass, 4 denotes a side door, 5 denotes a front pillar portion, and 6 denotes a roof side portion.

Figure 2:
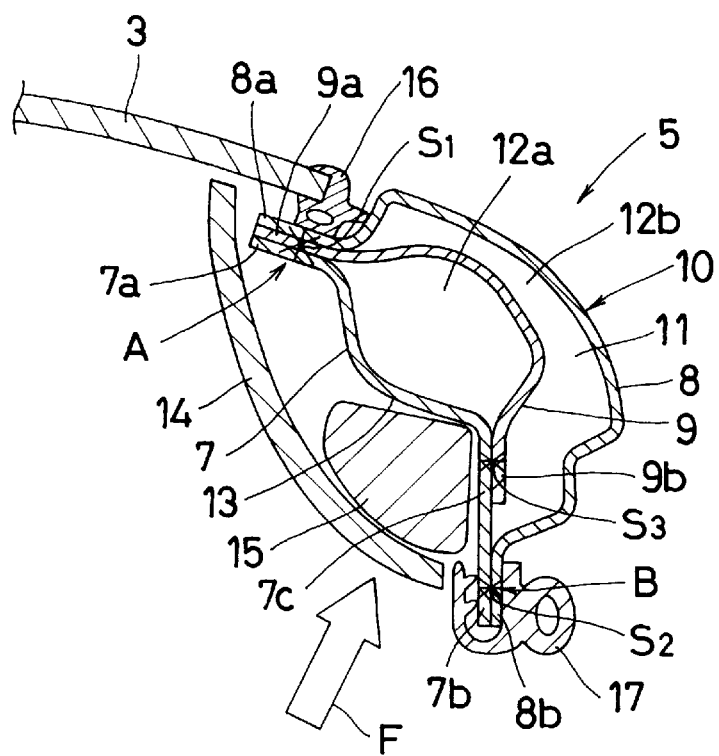
FIG. 2 is an enlarged sectional view taken along the line 2—2 of FIG. 1.

As shown in FIG. 2, the aforesaid front pillar portion 5 is formed by a vehicle body construction member 10 consisting of a side body inner panel 7, a side body outer panel 8, and a reinforcement 9. The reinforcement 9 is disposed in a closed cross section shape portion 11 formed by the side body inner panel 7 and the side body outer panel 8. Specifically, a flange 9a on one side (on the side of front wind shield glass) of the reinforcement 9 is held between the flanges 7a and 8a on one side of the side body inner panel 7 and the side body outer panel 8, and these three flanges are joined by spot weld $S_1$ at a location A. Also, flanges 7b and 8b on the other side (on the side of vehicle body) of the side body inner panel 7 and the side body outer panel 8 are lapped on each other, and these two flanges are joined by spot weld $S_2$ at a location B. Thus, a closed cross section shape portion 11 is formed by the side body inner panel 7 and the side body outer panel 8.

For the aforesaid reinforcement 9, as shown in FIG. 2, the portion except the flange 9a is disposed in the closed cross section shape portion 11, and arranged between these panels 7 and 8 with a space with respect to the side body inner panel 7 and the side body outer panel 8. A flange 9b on the other side of the reinforcement 9 is lapped on and joined by spot weld $S_3$ to the side body inner panel 7 at a position near the flange 7b in the closed cross section shape portion 11. Thereby, a closed cross section shape portion 12a is formed by the side body inner panel 7 and the reinforcement 9, and another closed cross section shape portion 12b is formed by the reinforcement 9 and the side body outer panel 8.

In this embodiment, in order to bias a weld location 7c of the side body inner panel 7, where the flange 9b of the reinforcement 9 is spot welded, from the base plane of the side body inner panel 7 to the side of the side body outer panel 8, the intermediate portion between the flanges 7a and 7b of the side body inner panel 7 is formed so as to be bent into a shape such as to be struck toward the side body outer panel 8, by which a planar buffer seating surface (seating surface for receiving a buffer) 13 substantially is provided along the vehicle body transverse direction. A buffer (shock absorbing element) 15 is disposed between a pillar trim 14 located facing the surface on the cabin side of the side body inner panel 7 and the side body inner panel 7, and the buffer 15 is in contact with the buffer seating surface 13 (see FIG. 2). In FIG. 2, reference numeral 16 denotes a molding disposed between the side body outer panel 8 and the front wind shield glass 3, and 17 denotes an opening trim mounted at the location B where two flanges are lapped.

Figure 3:
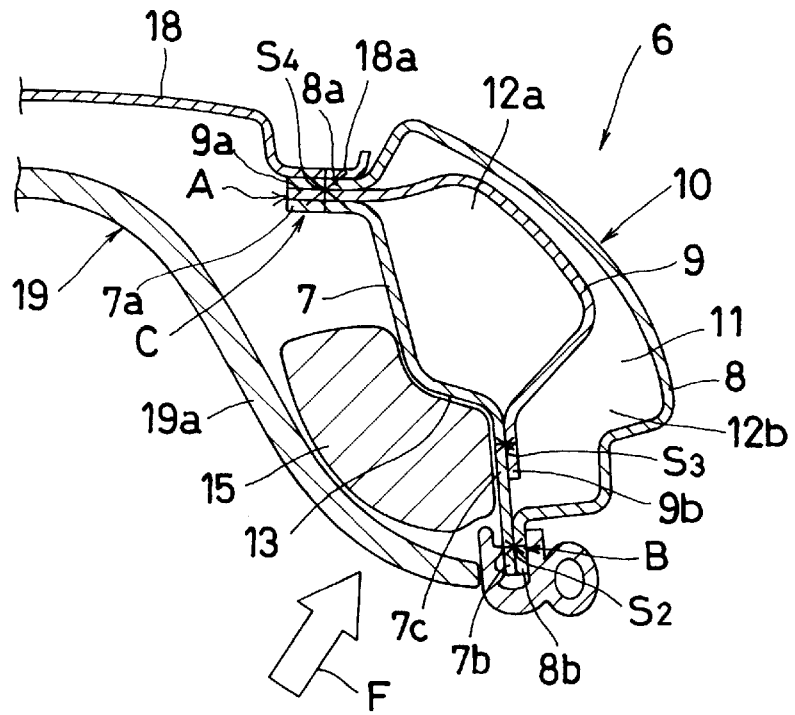
FIG. 3 is an enlarged sectional view taken along the line 3—3 of FIG. 1.

FIG. 3 shows a construction of a roof side portion 6. This construction is the same as that of the above-mentioned front pillar portion shown in FIG. 2 (in FIG. 3, the same reference numerals are applied to the same elements shown in FIG. 2). However, in the construction of the roof side portion 6, a side end flange 18a of a roof panel 18 is joined to the aforesaid location A, where three flanges are lapped, to form a location C where four flanges are lapped. At this location C, four flanges are integrally joined by spot weld $S_4$. A side end portion 19a of a roof lining 19 is disposed so as to face the cabin-side surface of the side body inner panel 7. The buffer 15 is interposed between the side end portion 19a of the roof lining 19 and the side body inner panel 7, being in contact with the buffer seating surface 13 of the side body inner panel 7.

According to the vehicle body construction thus configured, the flange 9b of the reinforcement 9 is not held between the flanges 7b and 8b of the side body inner panel 7 and the side body outer panel 8 and not joined by welding, but joined by welding to the intermediate portion of the side body inner panel 7 in the closed cross section shape portion 11. Therefore, the other side flange joint portion of the front pillar portion 5 and the roof side portion 6 forms the location B where two flanges are lapped. For this reason, the thickness of the joint location B is smaller by the thickness of the flange 9b of the reinforcement 9 than the case where three flanges are lapped, and accordingly the rigidity of the joint location B is decreased. As a result, if an excessive impact load is applied in the direction indicated by the arrow F in FIG. 3, the joint portion B is bent and deformed moderately, and a force for buffering the impact load is produced. The reinforcing strength of the front pillar portion 5 and the roof side portion 6 at the usual time is sufficiently assured by the presence of the reinforcement 9 in practical use.

According to this embodiment, the buffer seating surface 13 is formed by striking the weld location 7c of the side body inner panel 7, where the flange 9b of the reinforcement 9 is spot welded, from the base plane of the side body inner panel 7 toward the side body outer panel 8. Therefore, the buffer 15 can be seated well by using the buffer seating surface 13. For this reason, if an excessive impact load is applied, the buffer 15 comes into contact with the seating surface 13 without escaping, so that it can perform a sufficient impact absorbing function. Since the buffer 15 can sufficiently perform an impact absorbing function, the size of the buffer 15 can be made smaller than before.

Moreover, since the thickness of the location B where two flanges are lapped is smaller by the thickness of the flange 9b of the reinforcement 9 than before, and the size of the buffer 15 can be minimized, the thickness (cross section) of the front pillar portion 5 and the roof side portion 6 can be kept small, by which the field of vision can be increased.

Figure 4:
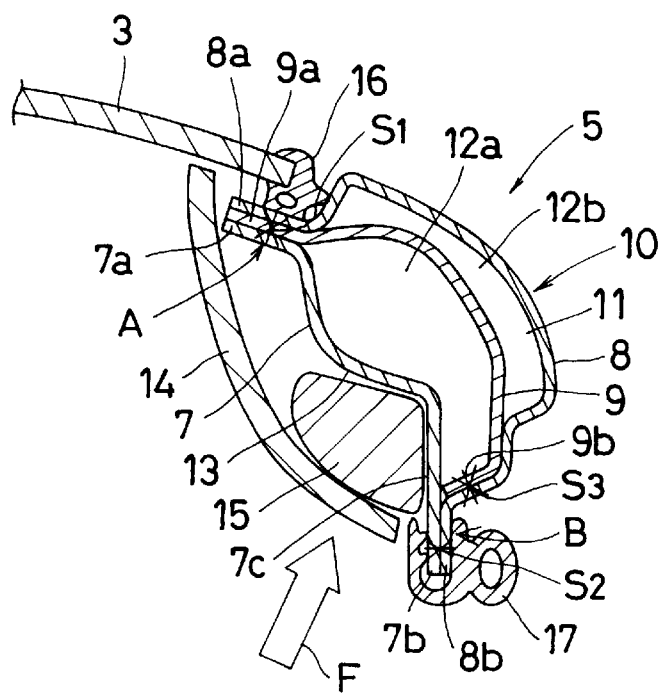
FIG. 4 is a sectional view which is the same as FIG. 2, showing a vehicle body construction in accordance with a second embodiment of the present invention.
Figure 5:
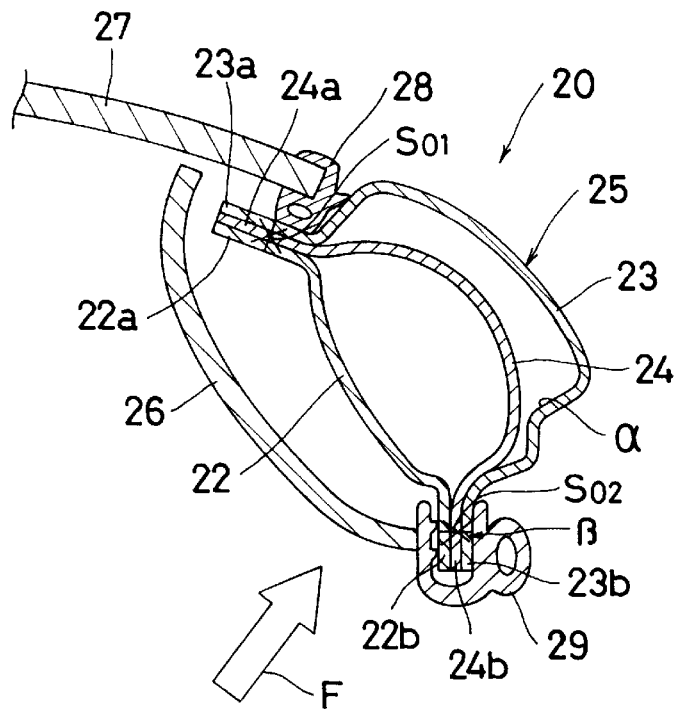
FIG. 5 is a sectional view of a front pillar portion for a four-wheel automobile having a conventional vehicle body construction.
Figure 6:
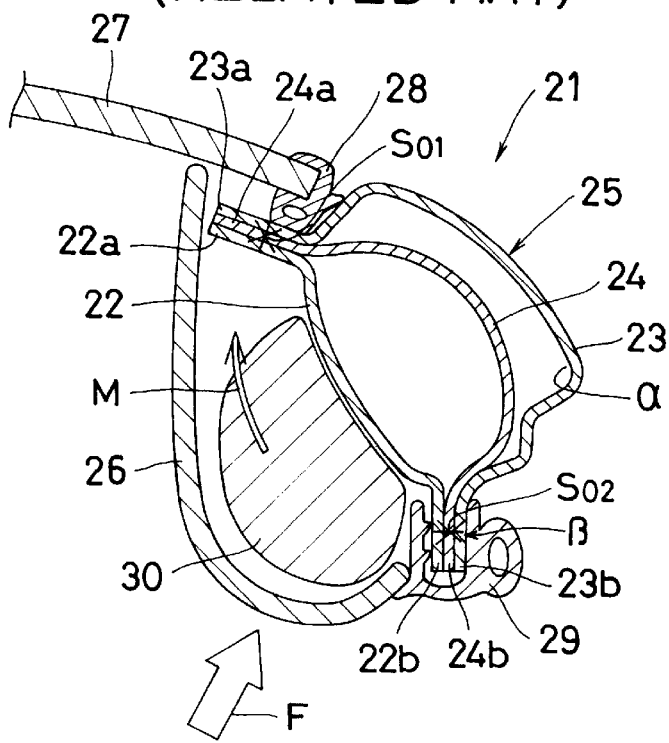
FIG. 6 is a sectional view of a front pillar portion for a four-wheel automobile having a conventional vehicle body construction, in which a buffer is disposed in the front pillar portion.
Figure 7:
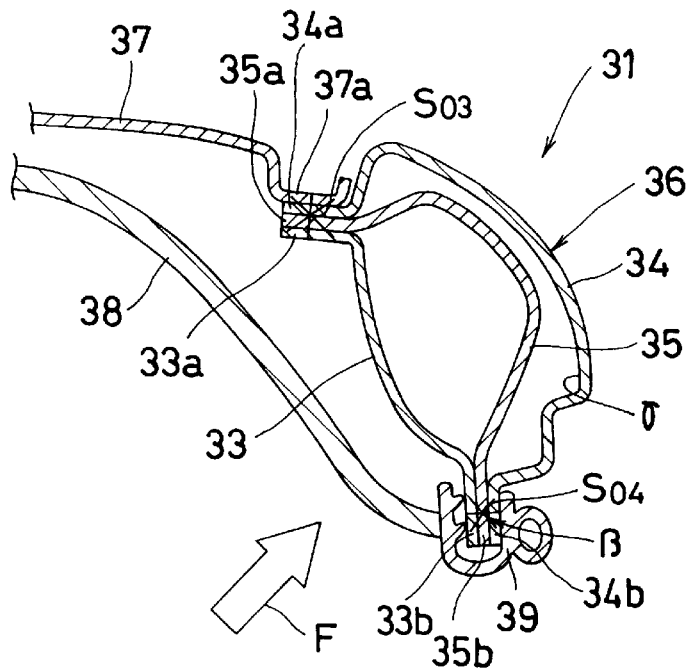
FIG. 7 is a sectional view of a roof side portion for a four-wheel automobile having a conventional vehicle body construction.
Figure 8:
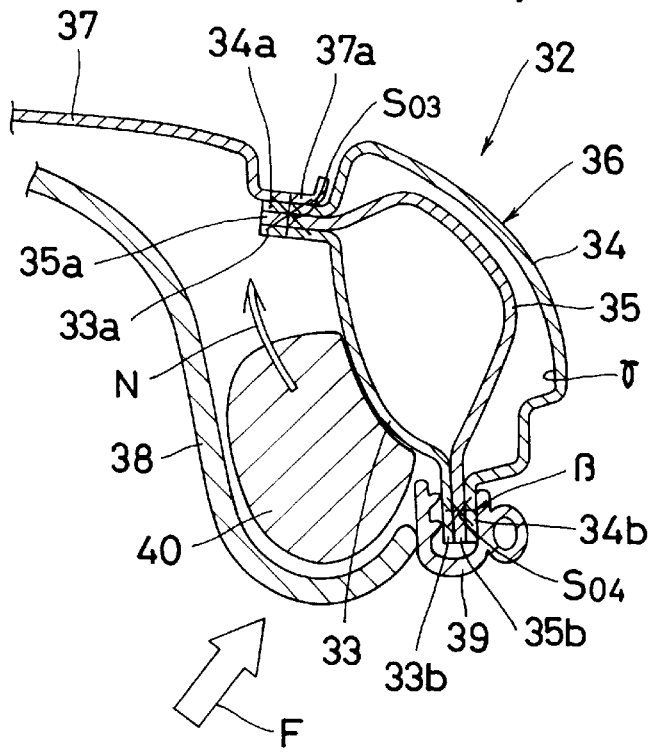
FIG. 8 is a sectional view of a roof side portion for a four-wheel automobile having a conventional vehicle body construction, in which a buffer is disposed in the roof side portion.

FIG. 4 shows a vehicle body construction in accordance with a second embodiment of the present invention. In FIG. 4, the same reference numerals are applied to the same elements shown in FIGS. 1 to 3.

In this embodiment, as shown in FIG. 4, instead of the fact that the flange 9b of the reinforcement 9 is joined to the side body inner panel 7, the flange 9b is joined to the side body outer panel 8 in the closed cross section shape portion 11. Also, the portion between one flange 7a of the side body inner panel 7 and the other flange 7b thereof is bent from the base plane of the side body inner panel 7 toward the side body outer panel 8, by which the side body inner panel 7 is provided with the seating surface 13 for receiving the buffer 15.

In this case as well, the same operation and effect as those of the above-described first embodiment can be achieved.

As described above, according to the present invention, one flange of the reinforcement is held between one flange of the inner panel and one flange of the outer panel and these three flanges are joined at the location where the three flanges are lapped, and the other flange of the inner panel and the other flange of the outer panel are joined at the location where the two flanges are lapped, by which the closed cross section shape portion is formed by the inner panel and outer panel, and the other flange of the reinforcement is joined to the inner panel or outer panel in the closed cross section shape portion. Therefore, the rigidity of the aforesaid location where two flanges are lapped can be kept lower than the conventional case where three flanges are lapped, so that that location is bent and deformed appropriately when an excessive impact load is applied, and therefore can perform an impact absorbing function. Whereas, a strength enough for overcoming an ordinary load can be assured by the presence of the reinforcement.

Also, according to the present invention, the other flange of the reinforcement is joined to the inner panel, and the joint location is bent from the base plane of the inner panel toward the outer panel so as to bias the location to the side of the outer panel, by which the inner panel is formed with the seating surface for receiving the buffer. Therefore, the buffer can be seated well at a position corresponding to the inner panel by this seating surface, and therefore can perform a sufficient impact absorbing function against an excessive impact load. Also, since the buffer can perform a sufficient buffering function, the size of the buffer can be kept small.

Further, according to the present invention, since two flanges are lapped as compared with the conventional case where three flanges are lapped, the thickness of the lapping location is decreased by the thickness of the reinforcement flange, and moreover the size of the buffer can be decreased as described above, so that the thickness of the vehicle body construction portion (for example, the front pillar portion 5 and the roof side portion 6 shown in the embodiments) can be decreased (the cross-sectional area can be decreased), and accordingly the field of view can be increased.

We claim:

1. A vehicle body construction comprising:

a reinforcement having a first and second reinforcement flange;

an inner panel having first and second inner panel flanges;

an outer panel having first and second outer panel flanges wherein said first reinforcement flange is positioned between said first inner and first outer panel flanges to form a first joint; and a closed cross section shape portion defined by said inner and outer panels wherein said second reinforcement flange is joined to said inner panel to form a second joint within said closed cross section shaped portion;

wherein said second inner panel flange and second outer panel flange are immediately adjacent one another; and wherein said inner panel is bent between said first and second inner panel flanges so as to bias said second joint toward said outer panel wherein said inner panel defines a seating surface, said vehicle body construction further comprising a buffer received within said seating surface.

2. A vehicle body construction comprising:

a reinforcement having a first and second reinforcement flange;

an inner panel having first and second inner panel flanges;

an outer panel having first and second outer panel flanges wherein said first reinforcement flange is positioned between said first inner and first outer panel flanges to form a first joint, said second inner panel flange is adjacent said second outer panel flange, and said second inner and outer panel flanges are joined to form a second joint; and a closed cross section shaped portion defined by said inner and outer panels wherein said second reinforcement flange is joined to said outer panel within said closed cross section shaped portion; and wherein an intermediate portion of said inner panel is bent between said first and second inner panel flanges in a direction toward said outer panel so as to define a seating surface, said vehicle body construction further comprising a buffer received within said seating surface.

* * * * *

UNITED STATES PATENT AND TRADEMARK OFFICE
CERTIFICATE OF CORRECTION

PATENT NO. : 5,988,733
DATED : November 23, 1999
INVENTOR(S) : Kamo et al.

It is certified that error appears in the above-identified patent and that said Letters Patent is hereby corrected as shown below:

Title page, [73] Assignee, in the Assignee's address, "Tokyo, Japan" should read --Hamamatsu, Japan--.

Title page, [56] References Cited, U.S. PATENT DOCUMENTS, line 3, "5,585,797" should read --5,586,797--.

Title page, [57] Abstract, line 7, "panel" should read --panels--.

Signed and Sealed this

Twenty-second Day of May, 2001

*Attest:*

NICHOLAS P. GODICI

*Attesting Officer*     *Acting Director of the United States Patent and Trademark Office*